Nov. 22, 1932.  A. J. SMITH  1,888,438
CONTINUOUS TWO-TABLE GLASSWARE FORMING MACHINE
Filed Oct. 18, 1929   5 Sheets-Sheet 1

Inventor;
Aloy J. Smith
by Bennet Cashau
Attorneys

Witness,
W. R. Thayer

Nov. 22, 1932.  A. J. SMITH  1,888,438
CONTINUOUS TWO-TABLE GLASSWARE FORMING MACHINE
Filed Oct. 18, 1929   5 Sheets-Sheet 2
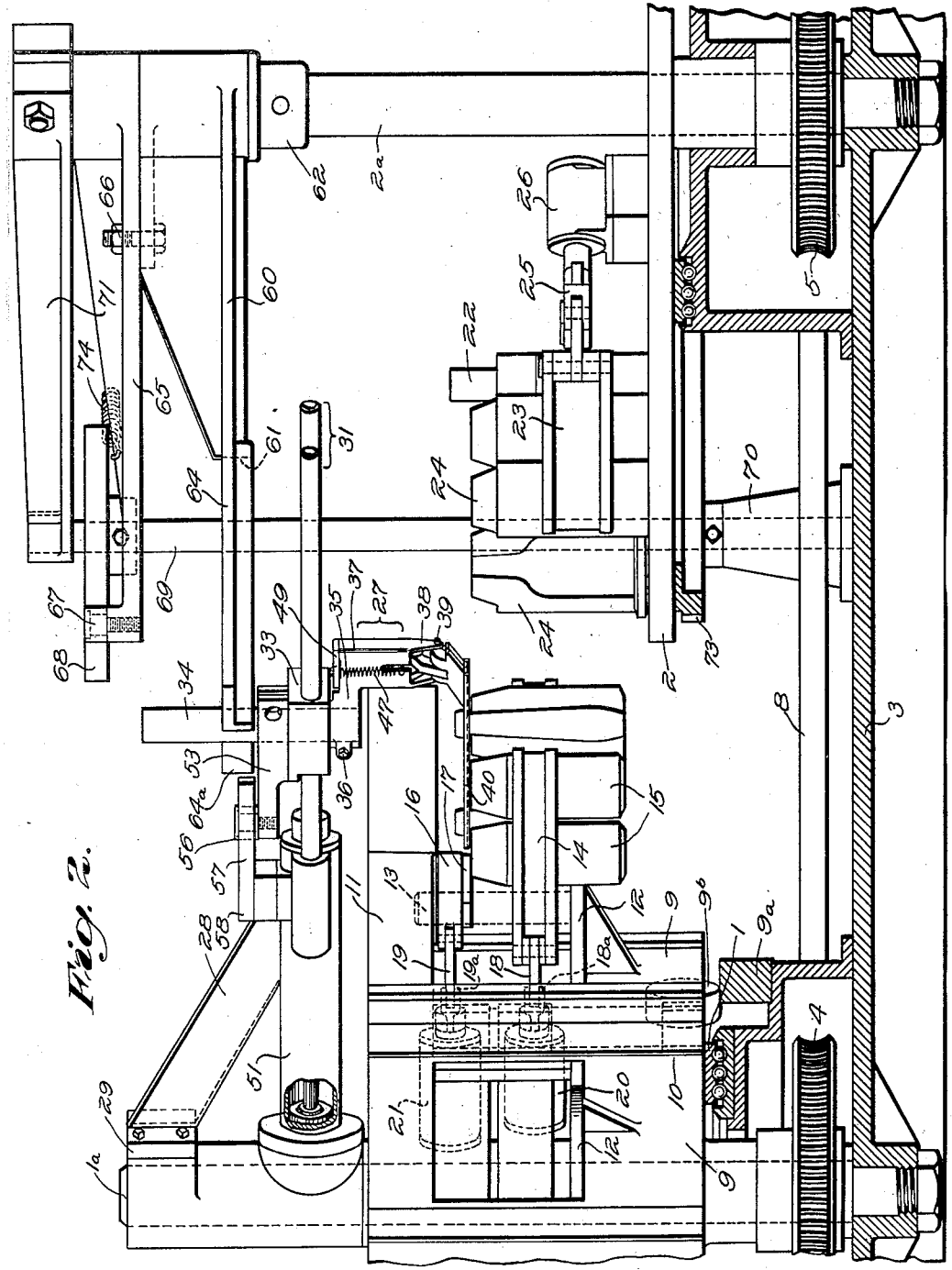
Witness,
W. B. Thayer.
Inventor;
Aloy J. Smith
by Brown & Parker
Attorneys Nov. 22, 1932.  A. J. SMITH  1,888,438
CONTINUOUS TWO-TABLE GLASSWARE FORMING MACHINE
Filed Oct. 18, 1929  5 Sheets-Sheet 3
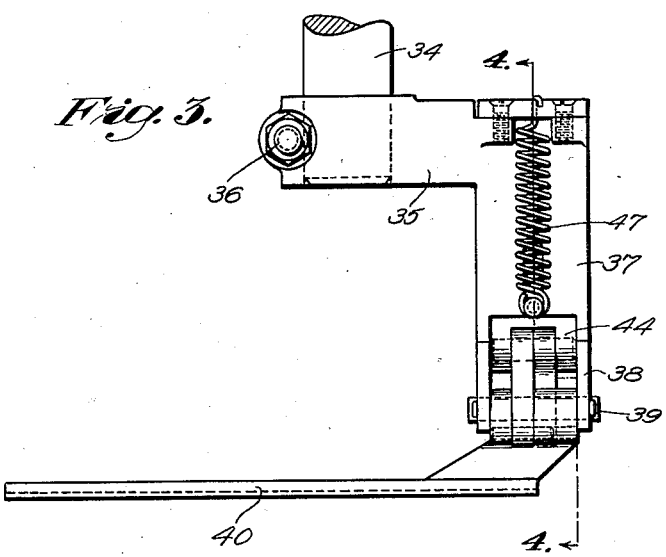
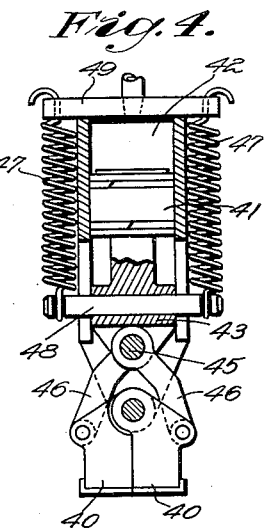

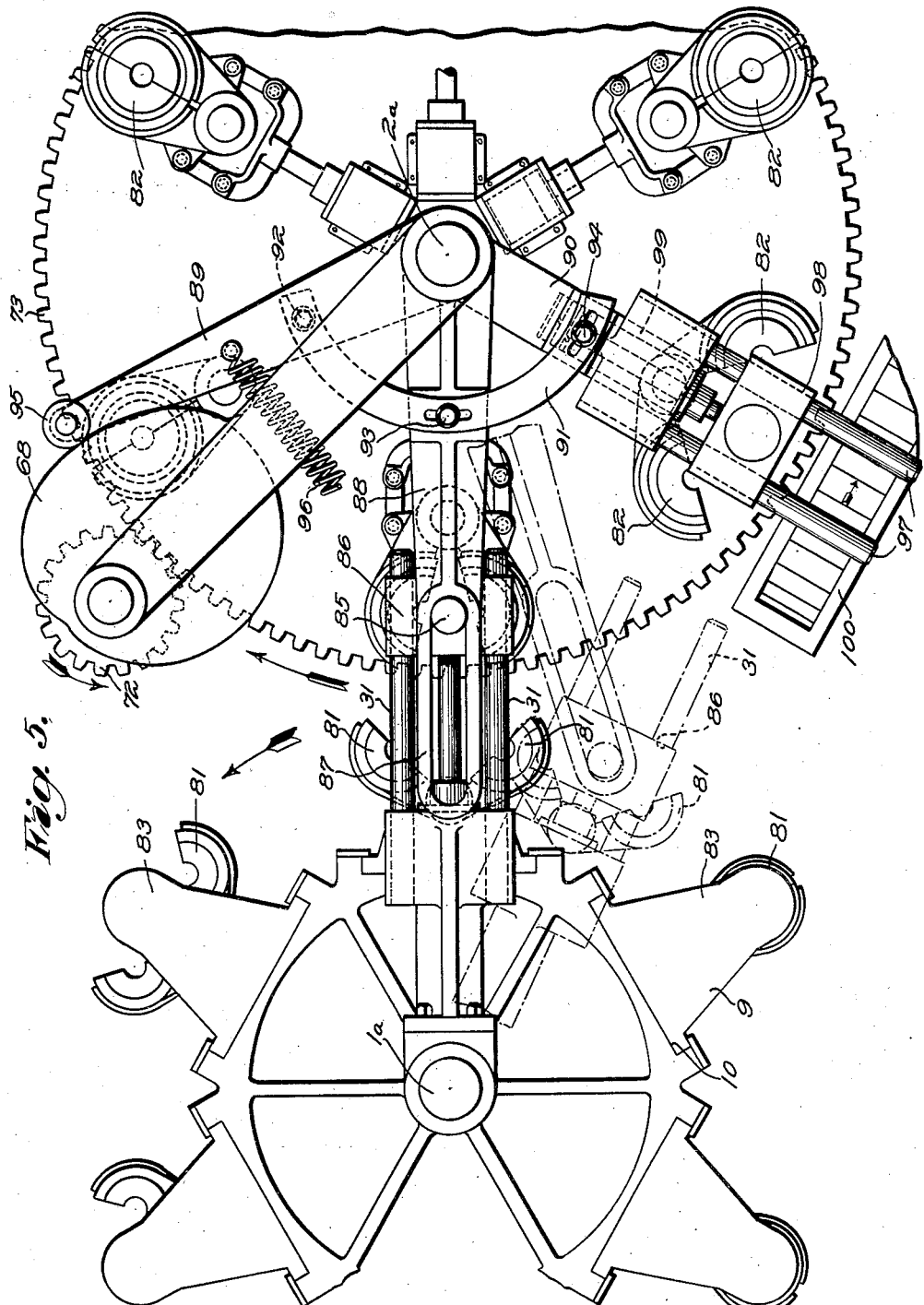

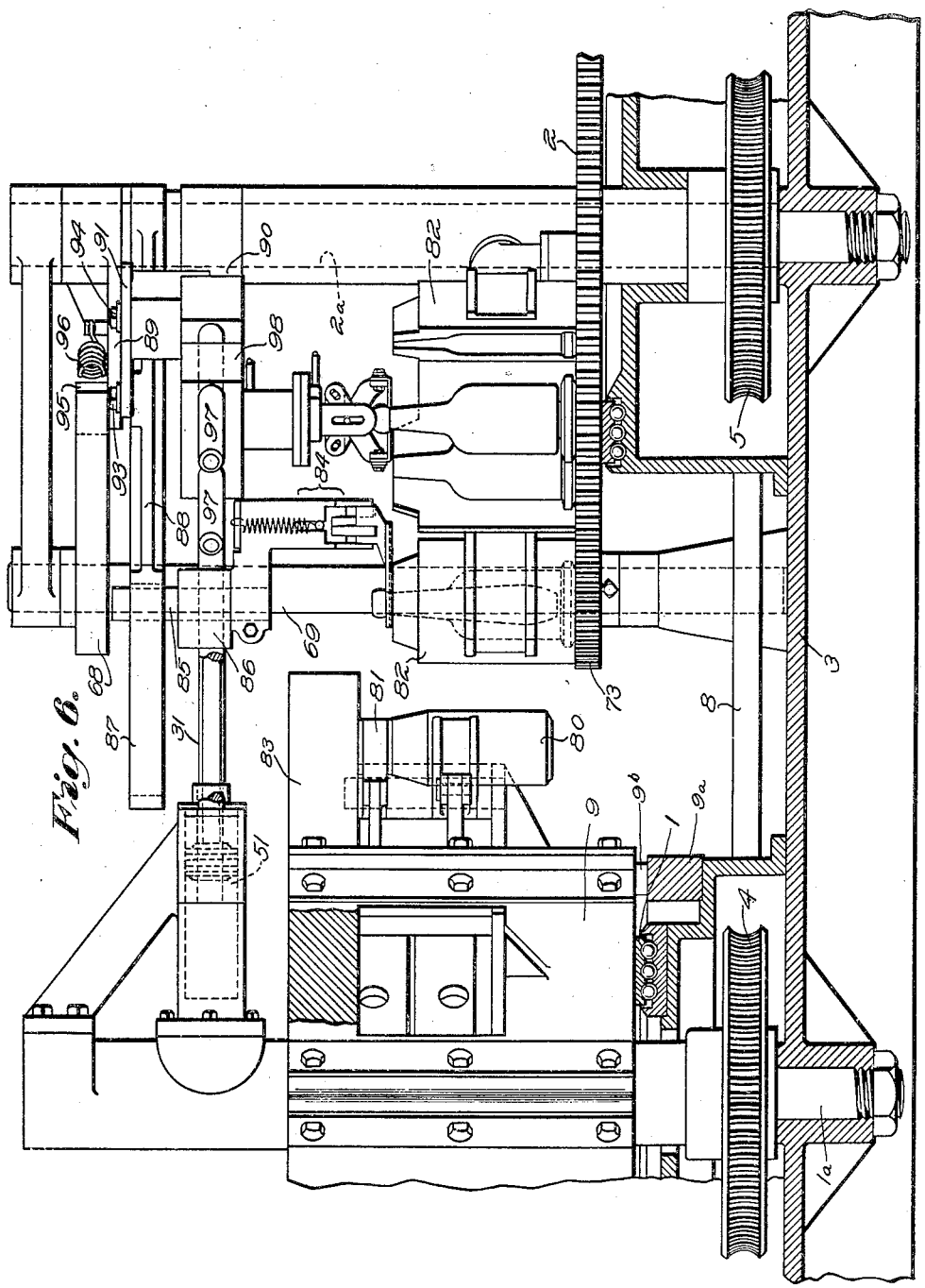

Patented Nov. 22, 1932

1,888,438

UNITED STATES PATENT OFFICE

ALGY J. SMITH, OF BLOOMFIELD, CONNECTICUT, ASSIGNOR TO HARTFORD-EMPIRE COMPANY, OF HARTFORD, CONNECTICUT, A CORPORATION OF DELAWARE

CONTINUOUS TWO-TABLE GLASSWARE FORMING MACHINE

Application filed October 18, 1929. Serial No. 400,519.

This invention relates to two-table glassware forming machines, and has particular relation to continuous machines of the two-table type, embodying means for transferring parisons from the parison molds to the blow molds.

It is an object of the present invention to provide a two-table forming machine of novel construction, embodying a single transfer device which is adapted to operate in cycles to transfer parisons successively from the parison molds on one table to the companion blow molds on the other table, while said molds are moving. The transfer device preferably is supported independently of, and above, the mold tables and may be adapted to transfer parisons successively from either single or plural cavity molds. One advantage of such a construction is that the weight of the mold tables is greatly reduced, as a result of which the machine may be operated more efficiently and more rapidly than similar machines in which the transfer mechanism is mounted directly on either or both of the mold tables.

Another object of this invention is to provide a novel two-table forming machine of the continuous type embodying tongs transfer mechanism which, in each cycle of operation, travels first with a parison mold on the parison mold table to grasp a parison and remove it from said mold, then moves laterally toward the blow mold table and travels in alignment with the companion blow mold to permit the blow mold to close about the parison. Preferably, a movable or rotating cam is provided for causing the coincident travel of the tongs mechanism with the parison and blow molds in the successive cycles of operation. The lateral movement of the tongs mechanism between the parison and blow mold tables may be limited positively to assure exact vertical alignment of the tongs with the parison in the parison mold, and of the tongs and a parison supported thereby with the cavity in the appropriate blow mold. Thus, injury to the parison when it is being transferred is prevented.

Another object of this invention is to provide a novel two-table glassware forming machine, including transfer and take-out devices operated jointly by a single means. The single operating means is so arranged as to cause the transfer and take-out devices to cooperate with adjacent blow molds for effecting respectively successive transfer and take-out operations.

Other objects of the invention will be pointed out in the detailed description thereof which follows, or will become apparent from such description.

In order that the invention may be more readily understood, and its manifold advantages appreciated, reference should be had to the accompanying drawings, in which two embodiments thereof are illustrated.

In said drawings:

Fig. 2 is a view partly in side elevation and partly in vertical longitudinal section of the construction shown in Fig. 1;

Fig. 3 is an enlarged view in side elevation of the transfer tongs employed in the machine illustrated in Figs. 1 and 2;

Fig. 4 is a view in vertical longitudinal section, taken on the line 4—4 of Fig. 3;

Figure 1:
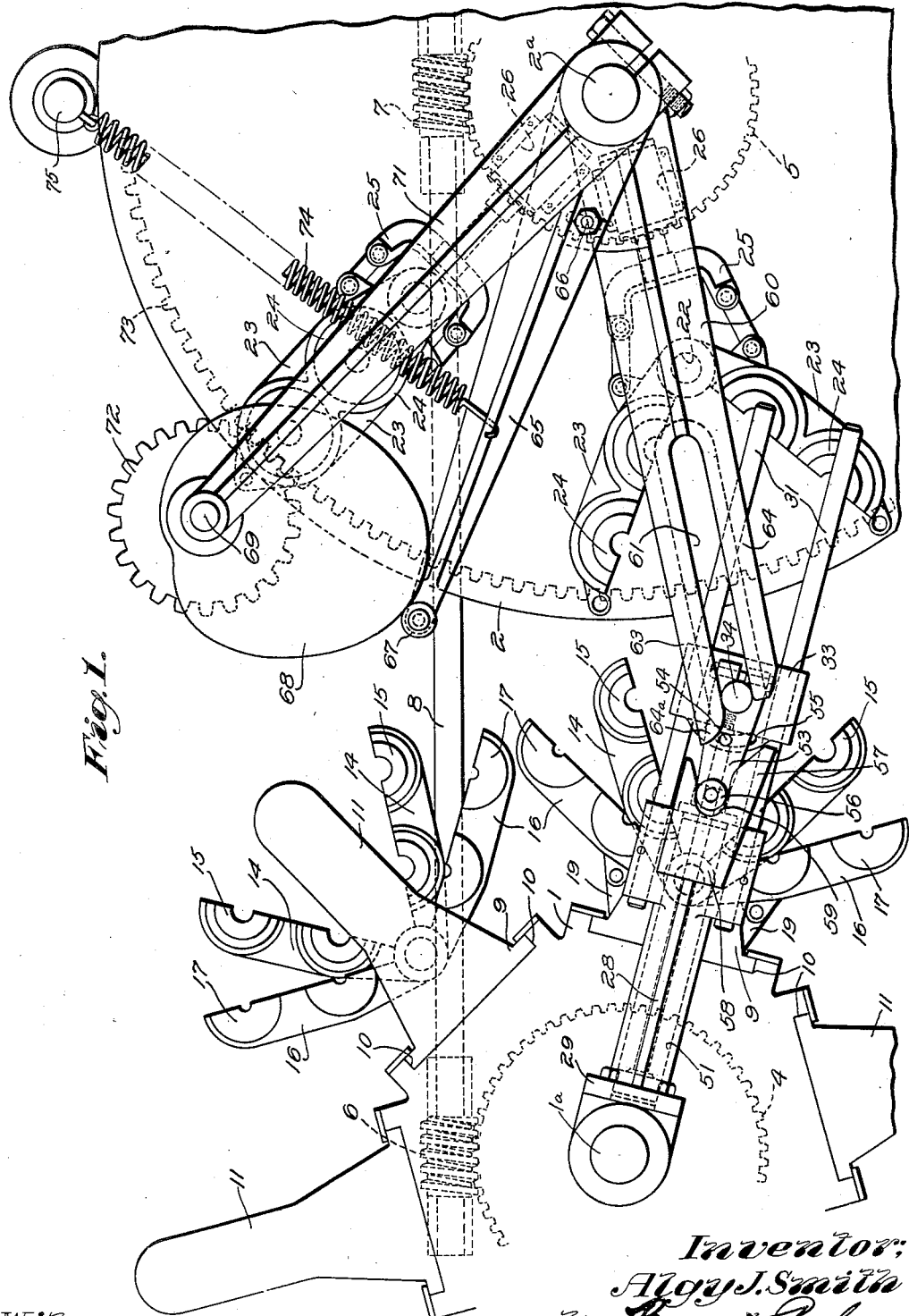
Figure 1 is a view in top plan of a machine embodying the present invention, and provided with plural cavity molds.

Fig. 5 is a view in top plan of another embodiment of the invention which is similar to that illustrated in Figs. 1 to 4, inclusive, but which may be provided with single cavity molds, and which preferably includes a take-out device arranged to be operated jointly with the transfer mechanism, as will appear hereinafter; and Fig. 6 is a view partly in side elevation and partly in vertical longitudinal section of the construction shown in Fig. 5.

Referring in detail to the drawings:

The parison mold table is designated at 1, and the blow mold table is indicated at 2, said tables being mounted respectively upon columns 1a and 2a secured to a base 3. The hubs of the parison mold and blow mold tables have worm gears 4 and 5, respectively, secured thereto, with which worms 6 and 7 mesh. The worms 6 and 7 are mounted upon a drive shaft 8 to which suitable driving means, not shown, is connected, so that the tables are rotated in opposite directions in timed relation with each other. Thus, companion parison and blow molds travel in about the same direction through the transfer zone.

Each of the mold tables has six molds mounted thereon, but any other number of molds may be used if desired. The molds on each of the tables may be identical in construction and therefore a description of one of each set will suffice for all.

Considering first the mold units on the parison mold table, it will be observed that each of said units is carried by a dipping frame designated generally at 9, said frame being mounted in a vertical guideway 10 formed on the periphery of the table. Suitable mechanism comprising cam 9a and roller 9b, is provided for raising and lowering the dipping frame at appropriate times to gather a charge of glass by suction in the parison mold from the surface of a gathering pool, not shown, in known manner. Each dipping frame carries a vacuum and blow head structure 11, extending laterally and outwardly from the table, and also a laterally extending horizontal bracket 12 formed on the frame some distance below the head 11. Extending between the head 11 and the bracket 12 is a pin 13 upon which are pivoted holders 14 of the plural cavity parison molds 15, and the holders 16 of the plural cavity neck molds 17. Connected to the holders 14 and 16, respectively, are links 18 and 19 connected to crossheads 18a and 19b to which in turn, air motors 20 and 21 are connected for opening and closing the molds at appropriate times. The mechanisms for opening and closing the molds form no part of the present invention and hence are not described in detail.

Mounted on the blow mold table 2 are upstanding studs 22 upon each of which the holders 23 for the pairs of sections 24 of each plural cavity blow mold are pivotally mounted. A crosshead 25 is connected through suitable linkage to the holders 23, which crosshead is in turn connected to an air motor 26, which serves to open and close the blow mold at the required times.

We now come to consider the transfer mechanism, which operates to transfer the parisons successively from each of the parison molds to the companion blow molds. To this end, tongs mechanism designated generally at 27 is provided. The supporting means for the tongs mechanism includes an outwardly and downwardly extending arm 28, the upper end of which is secured to a sleeve 29, rotatably mounted on the column 1a of the parison mold table. Rigidly secured to the outer end of arm 28 is a pair of parallel guide rods 31 upon which a slide 33 is mounted. Suitably journaled in the slide 33 is a vertical stub shaft 34, to the bottom end of which an angular member or tongs head 35 is clamped by means of a nut and bolt indicated at 36, Figs. 2, 3 and 4.

The member or head 35 to which the tongs are directly connected, comprises a vertical downwardly extending portion 37, the bottom end of which terminates in a pair of laterally spaced lugs 38. Extending between the lugs 38 is a pivot pin 39 which carries the tongs or grippers 40.

The tongs are closed by means of a piston 41 located in a chamber 42 (Fig. 4) in the head 35, and connected through a suitable conduit, not shown, to a source of air pressure. The rod of the piston 41 has a guide 43 formed on the bottom end thereof, which guide is provided with spaced lugs 44, which carry a pivot pin 45. Mounted on the pivot pin 45 are links 46, the bottom ends of which are pivotally connected to the tongs or grippers 40. The tongs are yieldingly held open by means of tension springs 47, the bottom ends of which are connected to the outer ends of a crosshead 48, extending through the guide 43, previously referred to, and the upper ends of which are connected to the ends of a cross-bar 49, secured to the top of the head 35, as shown. The tongs open and close with ascending and descending oscillating movements, as will be understood and grip both parisons at the same time.

The tongs are arranged on the head 35 so that the tong blades may be moved toward the center of the parison mold table without interference with the parts on the table and when the neck rings are opened, the tongs in their open position, may move into the space between the tops of the parisons and the head 11, and may then be closed under the finish of the parisons.

The tongs are moved radially toward and away from the parison mold table by the reciprocation of slide 33 on guide rods 31. Such reciprocation is effected by means of an air motor designated generally at 51, which motor is supported at one end by the arm 28, and at the other end by the sleeve 29, previously referred to. Suitable valve mechanism, not shown, is provided for controlling the reciprocation of the slide 33, in timed relation to the movements of the other parts of the machine, as will be understood.

As previously stated, the stub-shaft 34, which carries the tongs mechanism 27 is rotatably mounted in the slide 33. This permits the tongs mechanism to be turned in one direction or the other to align the tongs or grippers 40 radially of the parison table and thereafter radially of the blow table. Rotation of the tongs mechanism is effected by the following means.

Secured to the shaft 34 above the slide 33 is a crank arm 53. The crank arm 53 is guided in its movements by a pin 54 which is received in an arcuate slot 55 formed in the slide 33. The arm 53 carries a roller 56 on its outer end. When the slide 33 is moved inwardly of the parison mold table, the roller 56 strikes a guide 57 formed on the plate 58 mounted on arm 28, and is directed into an outwardly flaring slot 59 formed in said plate. As a result, the tongs are rotated into radial alignment with the parisons in the parison mold. The movement of the slide 33 and the tongs supported thereby, inwardly of the parison mold table is limited by the closed end of the slot 58, so that when the roller 59 strikes the inner end thereof, the openings in the tongs are vertically aligned with the parisons in a parison mold.

Oscillatory movements are imparted to arm 28 and hence to the tongs, to cause the tongs to travel alternately with a parison mold and the companion blow mold in each cycle of operation of the transfer mechanism. Such movements are effected by the following means:

Mounted on the column 2a is an arm 60, having a slot 61 formed therein. The arm is supported at the proper height by a collar 62 on said column. The arm 60 is so arranged that stub shaft 34 is retained in slot 61 in sliding engagement with the arm, thereby providing a lost-motion connection between arm 60 and the tongs mechanism.

The provision of slot 61 causes two prongs 63 and 64 to be formed on arm 60, of which prong 64 is the longer, the outer end thereof being rounded, as indicated at 64a, to guide roller 56 into slot 61, as will appear hereinafter.

Also mounted on column 2a is an arm 65 which is adjustably secured to the arm 60 by means of a nut and bolt, as indicated at 66. Arm 65 carries a cam roller 67 which engages the edge of a cam 68, secured to a vertical shaft 69. The shaft 69 is journaled at its bottom end in a pedestal 70 mounted on the base 3 of the machine. The upper end of said shaft is journaled in the outer end of an arm 71 clamped to the column 2a of the blow mold table, as shown.

The shaft 69, and hence cam 68, are rotated by means of a spur gear 72, secured to the shaft, which gear meshes with a ring gear 73 secured to the periphery of the blow mold table 2. Cam roller 67 is yieldingly held in engagement with the cam 68 by means of a relatively long tension spring 74, one end of which is secured to arm 65 and the other end of which is connected to a suitable stationary support indicated at 75.

The operation of the above described apparatus is as follows:

The mold tables 1 and 2 are rotated continuously in synchronism by the shaft 8. When a pair of parison molds and blow molds move toward each other toward the transfer zone, the neck mold is opened, and the slide 33 and the tongs supported thereby are moved inwardly of the parison mold table by the operation of the air motor 51. As a result, roller 56 engages the guide 57 and is drawn into the slot 59 of the guide plate 58, rotating the tongs clockwise and aligning them radially with the cavities in the parison mold. When the roller 56 strikes the inner end of the slot 59, the openings in the tongs will be in vertical alignment with the parisons in the parison mold, and the arm 28 and the tongs will be swung in a circular path about the axis of the parison mold table by the operation of cam 68. During such swinging movement, the stub shaft 34 will move in the slot 61 of the arm 60, and upon admission of air into cylinder 42, piston 41 will operate to close the tongs about the necks of the parisons in the parison mold.

After the parisons have been gripped by the tongs, the parison mold is opened, and the air motor 51 is operated to move the slide 33 and the tongs radially and outwardly of the parison mold table toward the blow mold table and the appropriate blow mold thereon. Such outward movement of the slide 33 and the tongs causes the stub shaft 34 to enter further into slot 61 and roller 56 thereupon will be guided into the slot 61. This will serve to rotate the tongs and the parisons supported thereby in a counterclockwise direction relative to slide 33, to align the parisons radially with the cavities in the blow mold. The stroke of air motor 51 is of sufficient length to cause stub shaft 34 to strike the inner end of slot 61. This serves to align the parison vertically with the cavities of the blow mold. As slide 33 is being moved outwardly of the parison mold table and toward the appropriate blow mold, cam 68 operates to swing the arm 60, arm 28, and the tongs and parisons in such manner that by the time the parisons are aligned vertically with the blow mold cavities, they will be moving coincidently with the previously opened blow mold, about the axis of the blow mold table. The blow mold now is closed about the parisons, whereupon the air pressure is exhausted from cylinder 42 of the tongs operating mechanism, to open the tongs, releasing the parisons in the blow mold. Cam 68 operates to swing the arm 28 and the tongs in a clockwise direction toward the succeeding parison mold, while the air motor 51 operates to move the slide 33 and the tongs on guide rods 31 radially and inwardly of the parison mold table to begin another transfer operation.

Considering now the embodiment shown in Figs. 5 and 6, it will be observed that the general arrangement of the mold tables and the molds thereon is substantially the same as that shown in Figs. 1 to 4, except that the single cavity parison molds 80, single cavity neck molds 81, and single cavity blow molds 82 are employed. The vacuum and blowheads 83 are constructed to cooperate with the single cavity neck and parison molds. In other respects, the tables and molds and the actuating means therefor are substantially identical to those shown in Figs. 1 to 4, and similar reference characters designate similar parts throughout the several figures.

In this form of the invention, the transfer mechanism resembles that of the embodiment already described with regard to the tongs supporting and reciprocating means, except that the tongs mechanism designated generally at 84 is adapted to transfer only one parison at a time. Therefore, the stub shaft 85 which supports the tongs head preferably is rigidly mounted in the slide 86, which is mounted on guide rods 31. As will be obvious, provision of means for rotating the tongs mechanism with respect to the slide is unnecessary in effecting the transfer of a single parison.

The stub shaft 85 is retained in a closed slot 87 provided in the tongs oscillating arm 88. The slide 86 and the tongs supported thereby are reciprocated relative to the guide rods 31 by the air motor 51 in substantially the same manner as the slide 33, of the previously described embodiment of the invention. Such movements of the slide and tongs are limited by the stub shaft 85 striking the opposite ends of the slot 87. Thus, the opening of the tongs will be aligned with a parison in a parison mold when the stub shaft is at the outer end of the slot 87, and with a blow mold when the stub shaft is at the inner end of said slot.

As previously stated, in the present embodiment of the invention, the transfer mechanism and a take-out device are operated jointly. Obviously this additional feature may readily be incorporated in mechanism similar to that of Figs. 1 to 4 employing plural cavity molds. A cam operated arm 89 mounted on the column 2a above the arm 88, and a take-out mechanism supporting arm 90 mounted on the column 2a below the arm 88, are connected to said arm for movement therewith as a unit. The arms 88, 89 and 90 preferably are adjustably secured together by means of a segmental member 91, one end of which is fixedly secured to arm 89 as indicated at 92, which is adjustably connected to arm 88 by means of a bolt indicated at 93 which extends through a slot in the middle portion of said member, and which is adjustably secured at its other end to the arm 90 by a similar bolt and slot connection as indicated at 94. Thus, the arms 88 and 90 may be adjusted relatively to each other and to the arm 89 to insure that the transfer and take-out devices will be properly aligned with their respective molds at the proper times.

Arm 89 carries a cam roller 95 which engages the cam 68 which is substantially identical with and operated in the same manner as the cam similarly numbered in the construction shown in Figs. 1 and 2. However, in the present construction the cam roller 95 engages the side of the cam 68 which is farthest removed from the parison mold table, as a result of which the tension spring 96, which is provided for holding the cam roller in engagement with the cam, extends in a direction opposite to the direction of spring 74. It will be understood that the spring 96 is connected to a suitable stationary support, not shown.

The arm 90 terminates in a pair of guide rods 97 upon which the take-out tongs mechanism, designated generally at 98, is slidably mounted. Arm 90 carries an air motor 99 for reciprocating the take-out mechanism radially of the blow mold table, whereby said mechanism is moved into vertical alignment with a blow mold to permit it to grasp a finished article of ware therein, and is moved outwardly of the blow mold table into vertical alignment with a suitable conveyor, such as is indicated at 100. The take-out tongs mechanism may be substantially the same as that disclosed in the patent to Lynch, No. 1,561,451, granted Nov. 10, 1925, and hence need not be described in detail.

The operation of the last described form of the invention is as follows:

The transfer mechanism operates in substantially the same manner as that shown in Figs. 1 to 4, inclusive, and will be readily understood. However, cam 68 operates through the arm 89 and the segmental member 91 to oscillate the transfer mechanism and the take-out device simultaneously, so that when the transfer tongs and a parison are moved in alignment with a blow mold, and the blow mold is closing about the parison, the take-out mechanism, previously moved into its innermost position, moves in alignment with the next preceding blow mold and is lowered to permit it to grip the neck of a finished article of glassware. The tongs mechanism, having grasped an article of glassware, is moved outwardly radially of the blow mold table by the air motor 99 as the arm is swung counterclockwise preferably in the direction of and at the same speed as the conveyor 100 upon which the article is discharged. After the article has been discharged, the arm 90 continues to move in a direction opposite to the direction of rotation of the table to move the device into radial alignment with the succeeding blow mold and the article of glassware therein, which then is moved inwardly of the blow mold table by air motor 99. Thereupon, the transfer device and the take-out mechanism repeat their respective simultaneous operations with respect to adjacent blow molds on the blow mold table.

It is to be expressly understood that my invention is not limited to the particular form of apparatus shown in the drawings, but may be used in conjunction with continuous two-table glassware forming machines to which glass may be supplied to the parison molds by gob feeding, or otherwise. Various changes in the details of construction of the illustrated embodiments may be made without departing from the scope of the appended claims.

Having thus described my invention, what I desire to claim and to secure by Letters Patent is:

1. Apparatus for fabricating glassware comprising a parison mold table, a plurality of parison molds thereon, a finishing mold table, a plurality of finishing molds thereon, means for supporting said tables for rotation about eccentric axes, means for continuously rotating said tables, and means for transferring parisons from the parison molds to the finishing molds comprising a single ware holder, a support for said holder, means for actuating said support to move the holder alternately into and out of vertical alignment with consecutive parison and finishing molds respectively, additional means for moving said support horizontally, and means for timing the operation of the last-named means with respect to said actuating means so that the carrier travels alternately with consecutive parison molds and consecutive finishing molds respectively while held in vertical alignment therewith.

2. In combination with a continuous two-table glassware forming machine having parison molds mounted on one table and companion blow molds mounted on the other table, means for continuously rotating said tables in opposite directions, a single transfer device for successively transferring parisons from the parison molds to the companion blow molds, a support for said device, means connected to said support for causing said device successively to move in a circular path about the axis of the parison mold table to grip parison in consecutive parison molds, and means for causing said device and a parison supported thereby to move successively in a circular path about the axis of the blow mold table with consecutive blow molds.

3. In combination with a continuous two-table glassware forming machine, a transfer device for successively transferring parisons from the parison molds on one table to the companion blow molds on the other table, and means for causing said device to travel alternately with successive parison molds and blow molds comprising an arm for supporting said device, said arm being mounted for oscillation about the axis of the parison mold table, means for oscillating said arm, and means for periodically moving said device inwardly and outwardly of said arm.

4. In combination with a continuous two-table glassware forming machine, having parison molds mounted on one table and companion blow molds mounted on the other table, ware-holding means for successively transferring parisons from the parison molds to the blow molds, and means for causing said ware-holding means to travel alternately with successive parison and blow molds comprising a support, a moving cam for swinging said support, and means for operating said cam in synchronism with the movements of said tables.

5. In combination with a continuous two-table glassware forming machine, having parison molds mounted on one table and companion blow molds mounted on the other table, a transfer device for successively transferring parisons from the parison molds to the blow molds, and means for causing said device to travel alternately with successive parison and blow molds comprising an arm for supporting said device, said arm being mounted for oscillation about the center of the parison mold table, a cam for oscillating said arm, and means for rotating said cam in timed relation to the rotation of said tables.

6. In combination with a continuous two-table glassware forming machine, having parison molds mounted on one table and companion blow molds mounted on the other table, a transfer device for successively transferring parisons from the parison molds to the blow molds, and means for causing said device to travel alternately with successive parison and blow molds comprising an oscillatory arm for supporting said transfer device, said transfer device being slidably mounted on said arm, means for oscillating said arm, and means for reciprocating said device relative to said arm.

7. In combination with a continuous two-table glassware forming machine, having parison molds mounted on one table and companion blow molds mounted on the other table, a transfer device for successively transferring parisons from the parison molds to the blow molds, and means for causing said device to travel alternately with successive parison and blow molds comprising an oscillatory arm for supporting said device, means for oscillating said arm, said device being slidably mounted on said arm, means for reciprocating said device relative to said arm, and means for positively limiting the reciprocatory movement of said device on said arm.

8. In combination with a continuous two-table glassware forming machine, having parison molds mounted on one table and companion blow molds mounted on the other table, a transfer device for successively transferring parisons from the parison molds to the blow molds, and means for causing said device to travel alternately with successive parison and blow molds comprising a support for said device movable about the axis of the parison mold table for causing said device to move in alignment with a parison mold, and means movable about the axis of the blow mold table for causing said device to travel in alignment with a blow mold.

9. In combination with a continuous two-table glassware forming machine having parison molds mounted on one table and companion blow molds mounted on the other table, means for rotating said tables in opposite directions, a single transfer device for successively transferring parisons from the parison molds to the companion blow molds, means for causing said device to travel alternately with successive parison and blow molds comprising a support, and a moving cam for causing said support and device to move with a parison mold to permit the removal of a parison from said mold by said device, and for causing said device to travel with a blow mold to permit the blow mold to be closed about a parison supported by said device.

10. In combination with a continuous two-table glassware forming machine, having plural cavity parison molds mounted on one table and plural cavity blow molds mounted on the other table, means for continuously rotating said tables, a single transfer device for successively transferring pairs of parisons from the parison molds to the blow molds, and means for acuating said device to effect such transferring while the molds are moving.

11. In combination with a continuous two-table glassware forming machine, having plural cavity parison molds mounted on one table and plural cavity blow molds mounted on the other table, a single transfer device for successively transferring parisons from the parison molds to the companion blow molds, and means for actuating said device to effect such transferring while the molds are moving including a cam for controlling the movements of said transfer device, and means for operating said cam in synchronism with the rotation of said tables.

12. In combination with a continuous two-table glassware forming machine, having plural cavity parison molds on one table and companion plural cavity blow molds on the other table, a single transfer device for successively transferring parisons from the parison molds to the blow molds, means for moving said device about a vertical axis to align said device radially with a parison mold, means for causing said device to travel in vertical alignment with said parison mold, means for rotating said device about said vertical axis into radial alignment with a blow mold, and means for causing said device to travel in vertical alignment with said blow mold.

13. In combination with a continuous two-table glassware forming machine, having plural cavity parison molds on one table and plural cavity blow molds on the other table, a single transfer device for successively transferring parisons from the parison molds to the companion blow molds, means for rotatably supporting said device for movement about a vertical axis, whereby said device may be aligned radially first with a parison mold and then with the companion blow mold, means for moving said device into vertical alignment with the parisons in a parison mold, means for moving said device into vertical alignment with the cavities in the companion blow mold, and means for positively aligning said device vertically with said parisons and blow mold cavities.

14. In combination with a continuous two-table glassware forming machine, having parison molds mounted on one table and blow molds mounted on the other table, a transfer device for successively transferring parisons from the parison molds to the blow molds, a take-out mechanism for removing finished ware from the blow molds, and a single means for jointly moving said transfer device and said take-out mechanism in operative relation to the moving blow molds.

15. In combination with a continuous two-table glassware forming machine, having parison molds mounted on one table and blow molds mounted on the other table, a single device for transferring parisons from the parison molds to the blow molds, take-out mechanism for successively removing the finished ware from the blow molds, said device and said mechanism being arranged to cooperate with adjacent molds, means for connecting said transfer device to said take-out mechanism and means for simultaneously and jointly moving said transfer device and said take-out mechanism during their respective operations in operative relation to said adjacent molds.

16. In combination with a two-table glassware forming machine, a single device for transferring glass articles from one table to the other, a means for rotating said tables, a carrier for removing articles from one of said tables, a cam for jointly moving said device and said carrier in the direction of rotation of one of said tables, and means for operating said cam in timed relation with the movements of said tables to move said device and said carrier while the tables are rotating.

17. In combination with a continuous two-table glassware forming machine, having parison molds mounted on one table and blow molds mounted on the other table, a transfer device for transferring parisons from the parison molds to the blow molds, take-out mechanism for removing the finished ware from said blow molds, and a single operating means connected to said transfer device and take-out mechanism for causing them to travel simultaneously and jointly in the same direction about the axis of the blow mold table.

18. In a machine for forming glassware, the combination of two continuously rotating tables mounted for rotation about eccentric axes, a blank mold on one table, a finishing mold on the other table, means for transferring blanks from the blank mold to the finishing mold, said means comprising a pair of tongs adapted to support a blank, a support for the tongs mounted for movement about the axis of the blank mold table, means carried by said support for projecting the tongs radially of said table to a position over and in register with a finishing mold, means for causing the tongs to travel in a horizontal plane relative to the projecting means and thereby follow the path of the finishing mold, means to close the finishing mold about the blank, and means operating to release the blank from the tongs after the finishing mold has closed.

19. In a glassware forming machine, blank and finishing mold tables arranged side by side and continuously rotating about vertical axes individual thereto, a blank mold on one table, a finishing mold on the other table, blank transfer means mounted for movement about the axis of the blank mold table and comprising a slide mounted for reciprocation radially of said table, a tong carrier mounted for movement along a curved path transversely of said slide, tongs suspended from the carrier, means for alternately opening and closing the tongs, means for moving the slide to thereby place the tongs in register with the finishing mold, means for moving the carrier and tongs along said curved path relative to the slide during a predetermined period of travel to thereby maintain register of the tongs and finishing mold, and means for transferring a blank from the tongs to the finishing mold while said tongs and mold register with each other.

20. In a glassware forming machine, blank and finishing mold tables arranged side by side and continuously rotating about vertical axes individual thereto, eccentric columns about which said tables rotate respectively, a blank mold on one table, a finishing mold on the other table, blank transfer means mounted for movement about the axis of the blank mold table and comprising a slide mounted for reciprocation radially of said table, a tong carrier mounted for movement along a curved path transversely of said slide, tongs suspended from the carrier, means for alternately opening and closing the tongs, means for moving the slide to thereby place the tongs in register with the finishing mold, means for moving the carrier and tongs along said curved path relative to the slide during a predetermined period of travel to thereby maintain register of the tongs and finishing mold, means for transferring a blank from the tongs to the finishing mold while said tongs and mold register with each other, and means normally holding the carrier and tongs in such position with respect to the slide that the tongs and blank mold are in register with each other when said arm is fully retracted.

21. In a glassware forming machine, blank and finishing mold tables arranged side by side and continuously rotating about vertical axes individual thereto, a blank mold on one table, a finishing mold on the other table, blank transfer means mounted for movement about the axis of the blank mold table and comprising a slide mounted for reciprocation radially of said table, a tong carrier mounted for movement along a curved path transversely of said slide, tongs suspended from the carrier, means for alternately opening and closing the tongs, means for moving the slide to thereby place the tongs in register with the finishing mold, means for moving the carrier and tongs along said curved path relative to the slide during a predetermined period of travel to thereby maintain register of the tongs and finishing mold, means for transferring a blank from the tongs to the finishing mold while said tongs and mold register with each other, and means normally holding the carrier and tongs in such position with respect to the slide that the tongs are in radial alignment with the corresponding blank mold.

22. In a glassware forming machine, blank and finishing mold tables arranged side by side and continuously rotating about vertical axes individual thereto, a blank mold on one table, a finishing mold on the other table, blank transfer means mounted for movement about the axis of the blank mold table and comprising a slide mounted for reciprocation radially of said table, a tong carrier mounted for movement along a curved path transversely of said slide, tongs suspended from the carrier, means for alternately opening and closing the tongs, means for moving the slide to thereby place the tongs in register with the finishing mold, means for moving the carrier and tongs along said curved path relative to the slide during a predetermined period of travel to thereby maintain register of the tongs and finishing mold, means for transferring a blank from the tongs to the finishing mold while said tongs and molds register with each other, and a cam controlled swinging lever for causing the holder to move in said curved path.

23. In a glassware forming machine, blank and finishing mold tables arranged side by side and continuously rotating about vertical axes individual thereto, a blank mold on one table, a finishing mold on the other table, blank transfer means mounted for movement about the axis of the blank mold table and comprising a slide mounted for reciprocation radially of said table, a tong carrier mounted for movement along a curved path transversely of said slide, tongs suspended from the carrier, means for alternately opening and closing the tongs, means for moving the slide to thereby place the tongs in register with the finishing mold, means for moving the carrier and tongs along said curved path relative to the slide during a predetermined period of travel to thereby maintain register of the tongs and finishing mold, means for transferring a blank from the tongs to the finishing mold while said tongs and molds register with each other, a cam controlled swinging lever for causing the holder to move in said curved path, and means normally holding the lever in position to cause register of the holder and blank mold when the arm is retracted.

24. A glassware forming machine comprising a mold table mounted for rotation about a vertical axis, a series of plural cavity mold units on said table, means for rotating said table to cause said molds to travel successively through a zone for the removal of articles from said units, and means for removing such articles comprising a ware holder having a plurality of article receiving portions, an arm for supporting said holder, a sliding connection between said ware holder and arm, a pivotal connection between said ware holder and said arm, means for oscillating said ware holder relative to said arm to place the ware receiving portions of said ware holder in the vertical plane of the articles in one of said units, means for causing sliding movement of said ware holder relative to said arm to vertically align the article receiving portions of the ware holder with the articles in said unit, means for oscillating said arm to cause the ware holder to travel in vertical alignment with the articles during the rotation of the table, means for causing the ware holder to remove the articles from said unit while said unit is moving, means for thereafter moving the ware holder outwardly of the mold table, and means for discharging the articles from said ware holder.

Signed at Hartford, Connecticut, this 17th day of October, 1929.

ALGY J. SMITH.